United States Patent [19]
Shridhar et al.

[11] Patent Number: 5,381,360
[45] Date of Patent: Jan. 10, 1995

[54] MODULO ARITHMETIC ADDRESSING CIRCUIT

[75] Inventors: Avadhani Shridhar, San Bruno; Douglas J. Gorny, Boulder Creek, both of Calif.

[73] Assignee: Hitachi America, Ltd., Tarrytown, N.Y.

[21] Appl. No.: 127,431

[22] Filed: Sep. 27, 1993

[51] Int. Cl.6 .................................. G06F 7/72
[52] U.S. Cl. ................................ 364/746
[58] Field of Search ....................... 364/746

[56] References Cited

U.S. PATENT DOCUMENTS

| | | | |
|---|---|---|---|
| 4,498,135 | 2/1985 | Caudel | 364/200 |
| 4,503,500 | 3/1985 | Magar | 364/200 |
| 4,514,808 | 4/1985 | Murayama et al. | 364/200 |
| 4,532,590 | 7/1985 | Wallach et al. | 364/200 |
| 4,631,671 | 12/1986 | Kawashita et al. | 364/200 |
| 4,689,738 | 8/1987 | van Wijk et al. | 364/200 |
| 4,722,067 | 1/1988 | Williams | 364/746 |
| 4,742,479 | 5/1988 | Kloker et al. | 364/746 |
| 4,744,043 | 5/1988 | Kloker | 364/746 |
| 4,774,652 | 9/1988 | Dhuey et al. | 364/200 |
| 4,847,759 | 7/1989 | Oklobdzija | 364/200 |
| 4,893,235 | 1/1990 | Butts, Jr. et al. | 364/200 |
| 4,893,279 | 1/1990 | Rahman et al. | 365/230.03 |
| 4,908,748 | 3/1990 | Pathak et al. | 364/200 |
| 4,935,867 | 6/1990 | Wang et al. | 364/200 |
| 5,233,553 | 8/1993 | Shak et al. | 364/746 |

*Primary Examiner*—David H. Malzahn
*Attorney, Agent, or Firm*—Flehr, Hohbach, Test, Albritton & Herbert

[57] ABSTRACT

A modulo addition circuit generates a sequence of values within a specified range having a lower bound value and an upper bound value. The modulo addition circuit generates a first value by adding a displacement value to a previously defined starting value, and generates a second value by adding to or subtracting from the first generated value a modulo value. Both the first and second values are generated in a single computational cycle using a single address circuit. When the first generated value is in the range defined the lower bound and upper bound values, the modulo addition circuit outputs the first value; otherwise the modulo addition circuit outputs the second generated value. The value output by the modulo addition circuit is stored in a register so as to be available as the starting value in a next computational cycle.

14 Claims, 7 Drawing Sheets

First Half of Address Computation Cycle:
Set A and I Input Multiplexers of Adder to Receive ADR and DISP values.
R1 = ADR + DISP
Latch R1 in Register 1879.

Second Half of Address Computation Cycle:
If SignBit(DISP) /* i.e., if DISP is Negative*/ {
   Set A and I Input Multiplexers of Adder to Receive R1 and MODVAL.
   Compare R1 with MStart.
   If R1 < MStart {
     Set SignBit(R3) = 1 }
   Else {
     Set SignBit(R3) = 0 }

R2 = ADR + MODVAL

If SignBit(R3)=1 {
     Result Output by Address Unit = R2 }
   Else {
     Result Output byAddress Unit = R1. }
   }

Else /* i.e., if DISP is Positive */ {
   Set A and I Input Multiplexers of Adder to Receive R1 and ~MODVAL.
   Compare R1 with MEndP1.
   If R1 < MEndP1 {
     Set SignBit(R3) = 1 }
   Else {
     Set SignBit(R3) = 0 }

R2 = ADR - MODVAL

If SignBit(R3)=1 {
     Result Output by Address Unit = R1 }
   Else {
     Result Output byAddress Unit = R2. }
   }

Latch Result in Address Register Specified by XAUSRC

MODULO ARITHMETIC ADDRESSING CIRCUIT

The present invention relates generally to addressing generation circuitry for microprocessors and digital signal processors, and particularly to specialized circuitry for generating a sequence of address values using modulo addition.

CROSS REFERENCES TO RELATED APPLICATIONS

The following applications, which are assigned to the same assignee as the instant application, have been filed on the same date as the instant application and contain related subject matter. They are incorporated herein by reference.

Digital Signal Processor and Method for Executing DSP and RISC Class Instruction Defining Identical Data Processing or Data Transfer Operations, Kiuchi et al., Ser. No. 08/127,694, filed Sep. 27, 1993.

Digital Signal Processor and Method for Executing an Instruction with Variable Length Type Code, Baji et al., Ser. No. 07/127,938, filed Sep. 27, 1993.

Digital Signal Processor and Associated Method for Conditional Data Operation with No Condition Code Update, Kiuchi et al., Ser. No. 07/127,691, filed Sep. 27, 1993.

On Chip DMA Controller with Interrupt Functions for Digital Signal Processor, Baji, Ser. No. 08/127,685, filed Sep. 27, 1993.

Double Precision Division Circuit and Method for Digital Signal Processor, Nakagawa et al., Ser. No. 08/127,660, filed Sep. 27, 1993.

Data Processor With Control Logic for Storing Operation Mode Status and Associated Method, Kiuchi, Ser. No. 08/127,679, filed Sep. 27, 1993.

On-Chip DMA Controller with Host Computer Interface, Baji et al., Ser. No. 08/127,429, filed Sep. 27, 1993.

Digital Signal Processor with No-Chip Address Decoder and Wait Status Controller, Baji, Ser. No. 08/127,682, filed Sep. 27, 1993.

BACKGROUND OF THE INVENTION

Many computational processes that are performed on digital signal processors (DSPs) require the generation of address values using modulo addition. The basic idea behind modulo addressing is that an address will be incremented or decremented by some Displacement for each new computational cycle until an upper or lower address boundary is reached, at which point the next address will "wrap around" to the other end of the address range being used.

For example, for a specified address range of 100 to 200, with a starting address of 101 and a Displacement of 10, the address value would increment to 111, 121,131, . . . 191 during the next nine computational cycles, and then on the next computational cycle the address would wrap around and be set equal to 101.

The term modulo is defined as follows:

$$\text{Result} = A \text{ modulo } B$$

means that Result is equal to A if A is less than B, and is equal to the remainder of A divided by B is A is larger than B. Thus, $$\text{Result} = A - \lfloor A \div B \rfloor$$

where "x" means the integer portion of x.

For "modulo" addressing, each new address is computed as follows:

$$\text{New Address} = \text{LowerBoundAddress} + (\text{PreviousAddress} + \text{Displacement}) \text{ Modulo Modval}$$

where

LowerBoundAddress is the lower bound on the address range,

PreviousAddress is the address value used in the previous computational cycle,

Modval is the difference between the upper and lower bounds of the address range, and Displacement is the amount that the address is incremented for each computational cycle.

In a variation on the above modulo addressing example, if the specified address range is made 100 to 199, with the same starting address and Displacement as before, the address value after the wrap around would be set equal to 102. The reason that the new address is equal to 102 instead of 101 is that the new address is computed using the above definition as follows:

$$\begin{aligned}\text{New Address} &= \text{LowerBoundAddress} \\ &+ (\text{PreviousAddress} + \text{Displacement}) \\ &\quad \text{Modulo Modval} \\ &= 100 + (91 + 10) \text{ Modulo } 99 \\ &= 100 + 2 = 102\end{aligned}$$

Existing modulo arithmetic implementations on DSP chips have restrictions on the location of the array and on the displacement and address that are to be added. In particular, the location of the array is typically restricted to require that the lower N+1 bits of the array's lower bound address must be equal to 0, where N is the most significant bit of the modulo value set equal to 1. This restriction on the array location is inconvenient because it complicates the problem of optimally locating in memory the various data arrays to be used in a computation. The first preferred embodiment of the present invention avoids this restriction, and thus give users complete flexibility in selecting the location of the memory array to be accessed using modulo addressing.

A second shortcoming in the prior modulo arithmetic implementations on DSPs has been the amount of circuitry required to implement modulo addressing. In particular, prior modulo adder circuits have generally utilized two cascaded adder circuits to generate a new modulo address value every computational cycle.

It is an object of the present invention to provide an address generating circuit that performs modulo addition and is efficient in terms of the amount of circuitry required to implement modulo addition.

Another object of the present invention is to provide a modulo addition address generating circuit that includes a single adder circuit.

Still another object of the present invention is to provide a modulo addition address generating circuit that places no restriction on the range of addresses generated by the modulo addition circuitry.

SUMMARY OF THE INVENTION

In summary, the present invention is a modulo addition circuit that generates a sequence of values within a specified range having a lower bound value and an upper bound value. The modulo addition circuit generates a first value by adding a displacement value to a previously defined starting value, and generates a second value by adding to or subtracting from the first generated value a modulo value. The modulo value, also called the wrap-around value, defines the difference between the upper and lower bounds of the specified range.

Both the first and second values are preferably generated in a single computational cycle (sometimes called a CPU instruction cycle) using a single address circuit. When the first generated value is in the range defined said lower bound and upper bound values, the modulo addition circuit outputs the first value; otherwise the modulo addition circuit outputs the second generated value. The value output by the modulo addition circuit is stored in a register so as to be available as the starting value in a next computational cycle.

The determination as to whether or not the first address is in the specified range is performed simultaneously with the generation of the second value in a first preferred embodiment, and immediately after generation of the second value in second and third preferred embodiments. In all the preferred embodiments this determination results in the generation of a multiplexer control signal. The first and second generated values are input to data input pods of an output selection multiplexer and the multiplexer control signal is input to a selection port of the output selection multiplexer. The output selection multiplexer outputs the one of the first and second generated values specified by the multiplexer control signal.

In a first preferred embodiment of the present invention the multiplexer control signal is generated by forming a predefined logical combination of (A) the sign bit of the displacement value and (B) a comparison bit value generated by comparing the first generated value with the lower bound value of the specified range if the displacement value is negative, or by comparing the first generated value with the upper bound value of the specified range if the displacement value is positive.

In second and third preferred embodiments of the present invention a decoder circuit determines the most significant bit of the modulo value, called bit N, which is set to a value of "1". In these two preferred embodiment the final result generated by the modulo addition circuit is formed by concatenating the N least significant bits of the value output by the output selection multiplexer to the N−M most significant bits of the starting value.

In a second preferred embodiment of the present invention the multiplexer control signal (for the output selection multiplexer) is generated by forming a predefined logical combination of (A) the sign bit of the displacement value, (B) the sign bit of the first generated value, and (C) the sign bit of the second generated value.

In a third preferred embodiment of the present invention the multiplexer control signal is generated by forming a predefined logical combination of (A) the sign bit of the displacement value, (B) the bit N to bit N+1 carry bit generated by the adder circuit during generation of the first generated value, and (C) the bit N to bit N+1 carry bit generated by the adder circuit during generation of the second generated value.

In all three preferred embodiments it is preferred to use a single adder circuit twice during each computational cycle so as to use as little circuitry in the modulo addition circuit as possible. However, for implementations with very short computational cycles times the present invention can be implemented with two cascaded adder circuits.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Address Unit Architecture

Figure 1:
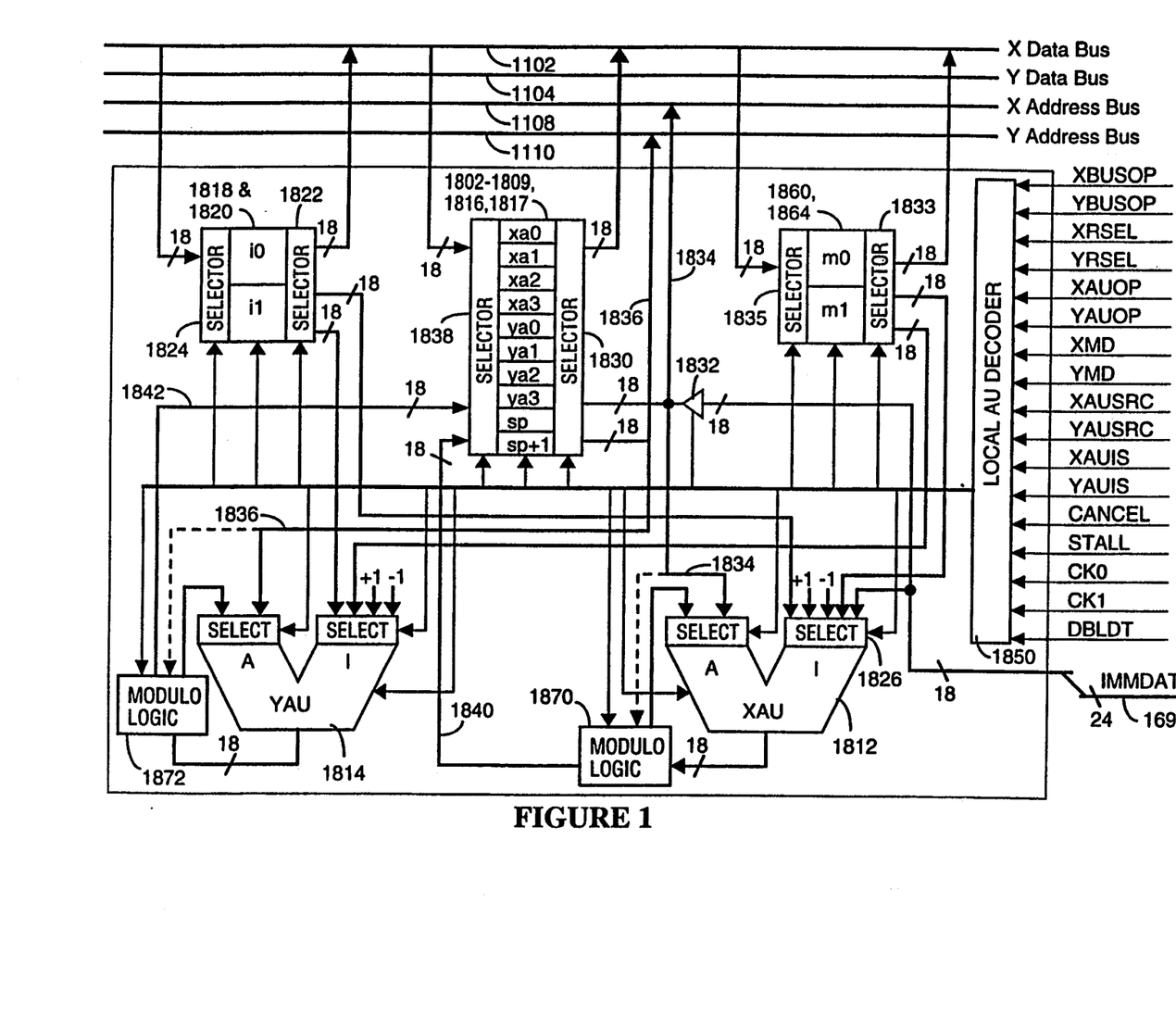
FIG. 1 is a block diagram of a two address units suitable for use in a digital signal processor.

Referring to FIG. 1, there is the address unit architecture, used in a preferred embodiment of the present invention. Since the address unit 1800 of the preferred embodiment is implemented in a digital signal processor the address unit generates and outputs address signals on two address busses XA and YA 1108 and 1110.

A set of eight address registers (xa0–xa3, ya0–ya3) 1802–1809 and two stack pointers sp, sp+1 1816, 1817 are used as sources of address values to be asserted on the address busses 1108 and 1110, and also as input values sources for the X address unit (XAU) 1812 and Y address unit 1814. Index registers 1818 and 1820 (i0 and i1) store 18 bit indexing (i.e., displacement) values. Modulo registers 1860 and 1864 (m0 and m1) store modulo values that define the size of an address range to be accessed. Each of the address registers 1802–1809 (xa0–ya3), stack pointer 1816 (sp), index registers 1818 and 1820 (i0 and i1) and modulo registers 1860 and 1864 (m0 and m1) are 18-bit registers that store 18-bit address or displacement values.

Each of the eight address registers 1802–1809 (xa0–ya3) can be an address source for the X address bus 1108 or as an address source for the Y address bus 1110 as well as an address source for either the XAU 1812 or YAU 1814 (each address register can be used as the address source for only one of XAU and YAU during each instruction cycle). Each of the index registers 1818 and 1820 (i0 and i1) can be an index value source for either the XAU 1812 or YAU 1814 or both. Modulo registers 1860 and 1864 (m0 and m1) can each be a modulo value source for either the XAU 1812 or YAU 1814 or both.

The XBUSOP, YBUSOP, XAUOP, YAUOP, XMD, YMD, XAUSRC, YAUSRC, XAUIS, YAUIS, and DBLDT signals (generated by a decoder unit not shown here) are received by the local address unit (AU)

controller 1850. This controller decodes these signals and in response generates control signals for controlling operation of each of the subcircuits of the address unit 1800.

The XAUOP signal specifies an address generation or update operation to be performed by the X address unit (XAU) 1812. The YAUOP signal specifies an address update operation to be performed by the Y address unit (YAU) 1814.

The XAUIS signal selects the source of the indexing operand used for various types of address updates defined by the XAUOP signal and performed by the X address unit 1812. The YAUIS signal selects the source of the indexing operand used for various types of address updates defined by the YAUOP signal and performed by the Y address unit 1814.

The X address source (XAUSRC) signal is a 4-bit signal that specifies (a) one of the eight address registers 1802-1809 of the address unit (AU) 1800 to output an address onto the X address bus 1108, (b) the push stack pointer (sp) 1816 or pop stack pointer (sp+1) to output an address onto the X address bus 1108, or (c) loading immediate data from immediate data lines 1698 onto the X address bus 1108. The Y address source (YASRC) signal is a 3-bit signal that specifies one of the eight address registers 1802-1809 of the address unit (AU) 1800 to output an address onto the Y address bus 1110.

The local address unit (AU) controller 1850 generates address source control signals which are provided to the selector 1830 and buffer and 1832 in response to the XAUSRC and YAUSRC signals.

If the XAUSRC signal designates one of the address registers 1802-1809 (xa0-ya3), the push stack pointer 1816 (sp) or pop stack pointer (sp+1) 1817, the address source control signals generated by the local address unit (AU) controller 1850 control the selector 1830 to output onto the 18 bit internal XSRC bus 1834 and onto the X address bus 1108 the 18 bits of data output by whichever of these registers was designated by the XAUSRC signal.

If the XAUSRC signal designates immediate address data, the address source control signals generated by the local address unit (AU) controller 1850 control the buffer 1832 to output onto the 18 bit internal XSRC bus 1834 and onto the X address bus 1108 the 18 bits of data provided by the immediate data lines 1698.

On the other hand, if the DBLDT signal is received and YAUSRC signal designates one of the address registers 1802-1809 (xa0-ya3), the address source control signals generated by the local AU controller 1850 control the selector 1830 to output onto the 18 bit internal YAUSRC bus 1836 and onto the Y address bus 1110 the 18 bits of data output by whichever of these registers was designated by the YAUSRC signal.

The XAUOP signal specifies the operation to be performed by the XAU 1812. In particular, XAUOP specifies that the address output onto the XSRC bus 1836 by whichever address register 1802-1809 (xa0-ya3) was designated by the XAURSC signal is to be (a) not updated, (b) incremented and then stored in the same register, (c) decremented and then stored in the same register, or (d) added together with an index (or displacement) value and then stored in the same register. In response to the XAUOP signal, the local address unit (AU) controller generates control signals that control the X address unit (XAU) 1812 to update or not update the address one of the ways just described. When the XAUOP signal indicates that the address on the XSRC bus 1836 is to be added to an index value, the XAUIS signal identifies the source of the index value. If the XAUIS signal identifies one of the index registers 1818 or 1820 (i0 or i1), then the address unit (AU) controller 1850 generates a control signal for controlling the selectors 1822 and 1826 to output to source I of the X address unit (XAU) 1812 the index value contained by the specified index register. On the other hand, if the XAUIS signal indicates that immediate data will be the index value, then the address unit (AU) controller 1850 generates a control signal for controlling the selector 1826 to output to source I of the X address unit (XAU) 1812 the index value on the immediate data lines 1698.

The YAUOP signal specifies the address output onto the YAUSRC bus 1836 by whichever address register 1802-1809 (xa0-ya3) was designated by the YAURSC signal is to be (a) not updated, (b) incremented and then stored in the same register, (c) decremented and then stored in the same register, or (d) added together with an index (or displacement) value and then stored in the same register. In response to the YAUOP signal, the local address unit (AU) controller generates control signals that control the Y address unit (XAU) 1814 to update or not update the address one of the ways just described. When the YAUOP signal indicates that the address on the YAUSRC bus 1836 is to be added to an index value, the YAUIS signal identifies the source of the index value. The YAUIS signal can only identify one of the index registers 1818 or 1820 (i0 or i1) as an index source. In response to the YAUIS signal, the address unit (AU) controller 1850 generates a control signal for controlling the selector 1822 to output to source I of the Y address unit (YAU) 1814 the index value contained by the specified index register.

The XMD and YMD signals specify whether or not to apply modulo arithmetic to the operation specified by the XAUOP and YAUOP signals, respectively. For instance, the XAUOP signal may specify an increment (add 1), decrement (subtract 1), or add index (add i0 or i1 or value on Immdata bus 1698) operation. Any of those address generation operations can be performed with or without modulo arithmetic.

The local address unit (AU) controller 1850 also generates data transfer control signals which are provided to the selectors 1822, 1830, 1832 and 1833 in response to the XRSEL, YRSEL, XDBUSOP, YDBUSOP signals.

The XDBUSOP signal may indicate that data is to be stored or pushed to data memory unit 1900 from a register. If this is the case and the XRSEL signal specifies one of the address registers 1802-1809 (xa0-ya3), stack pointer register 1816 (sp), one of the index registers 1818 or 1820 (i0 or i1), or one of the modulo registers 1860 or 1864 for doing so, then the local address unit (AU) controller 1850 generates a control signal sent to the selector 1830, selector 1822 or selector 1833 for controlling that selector to output onto the X data bus 1102 the data stored by whichever of the registers was designated by the XRSEL signal.

On the other hand, the XDBUSOP signal may indicate that data is to be loaded or popped from data memory unit 1900 to a register or that immediate data is to be loaded to a register. If this is the case and the XRSEL signal specifies one of the address registers 1802-1809 (xa0-ya3), stack pointer register 1817 (sp+1), index registers 1818 or 1820 (i0 or i1), or modulo registers 1860 or 1864 for doing so, the local address unit (AU) controller 1850 will generate a control signal sent to selector 1824, selector 1838 or selector 1835 for controlling that selector to input data from the X data bus 1102 to whichever of the registers was designated by the XRSEL signal.

If the XDBUSOP signal indicates that data is to be moved from one register to another and the XRSEL signal specifies one of the address registers 1802–1809 (xa0–ya3), index registers 1818 or 1820 or modulo registers 1860 or 1864, then the local address unit (AU) controller 1850 generates a control signal sent to the selector 1822, selector 1830, or selector 1833 for controlling that selector to output data from whichever of the registers was designated by the XRSEL signal onto the YAU input bus 1836. Furthermore, if the YRSEL signal in this case specifies one of the address registers 1802–1809 (xa0–ya3), index registers 1818 or 1820, or modulo registers 1860 or 1864, then the address unit (AU) controller 1850 generates a control signal sent to selector 1824, selector 1838 or selector 1835 for controlling that selector to input data from the YAU output data bus 1842 to whichever of the registers was designated by the YRSEL signal.

The local address unit (AU) controller 1850 also receives the clock signals CK0 and CK1. These signals are used by the local address unit (AU) controller 1850 for proper timing in generating the control signals described earlier.

The local address unit (AU) controller 1850 may also receive the CANCEL signal from the condition check block 1616 of the common decoder unit 1600. In response, it generates control signals for controlling the address registers 1802–1809, stack pointer registers 1816, 1817 and the index registers 1818 and 1820 to not store any data received from the X data bus 1102, internal bus 1840, or internal bus 1842 via the selectors 1824, 1835 and 1838.

Furthermore, the local address unit (AU) controller 1850 may receive the STALL signal provided by the parallel arbiter 2100. When it does receive this signal, it generates control signals for controlling the address registers 1802–1809, 1816, 1817, 1818 and 1820 to not store any data received from the X data bus 1102, the internal bus 1840, or internal bus 1842 via the selectors 1824, 1835 and 1838.

Modulo Logic

Referring to FIG. 1, both the X and Y address units 1812 and 1814 have respective associated modulo logic circuits 1870 and 1872. Since the two modulo logic circuits are identical, only one of the modulo circuits (the modulo circuit 1872 for the Y address unit 1814) will be described in the following sections of this document.

It should be noted that for all the preferred embodiments, in order for the result of the modulo computation to be valid it is required that (1) the starting address value ADR for each modulo computation be inside the specified address range (between MStart and MEnd), and (2) the displacement value DISP must be smaller or equal in magnitude than the modulo value (i.e., smaller than or equal to the size of the address range): $|DISP| \leq MODVAL$. It is generally up to the person writing a program to be executed by the DSP, or up to the compiler if a compiler is being used, to make sure that the starting address ADR and displacement DISP satisfy these restrictions.

Address Unit and Execution Unit Timing

Figure 2:
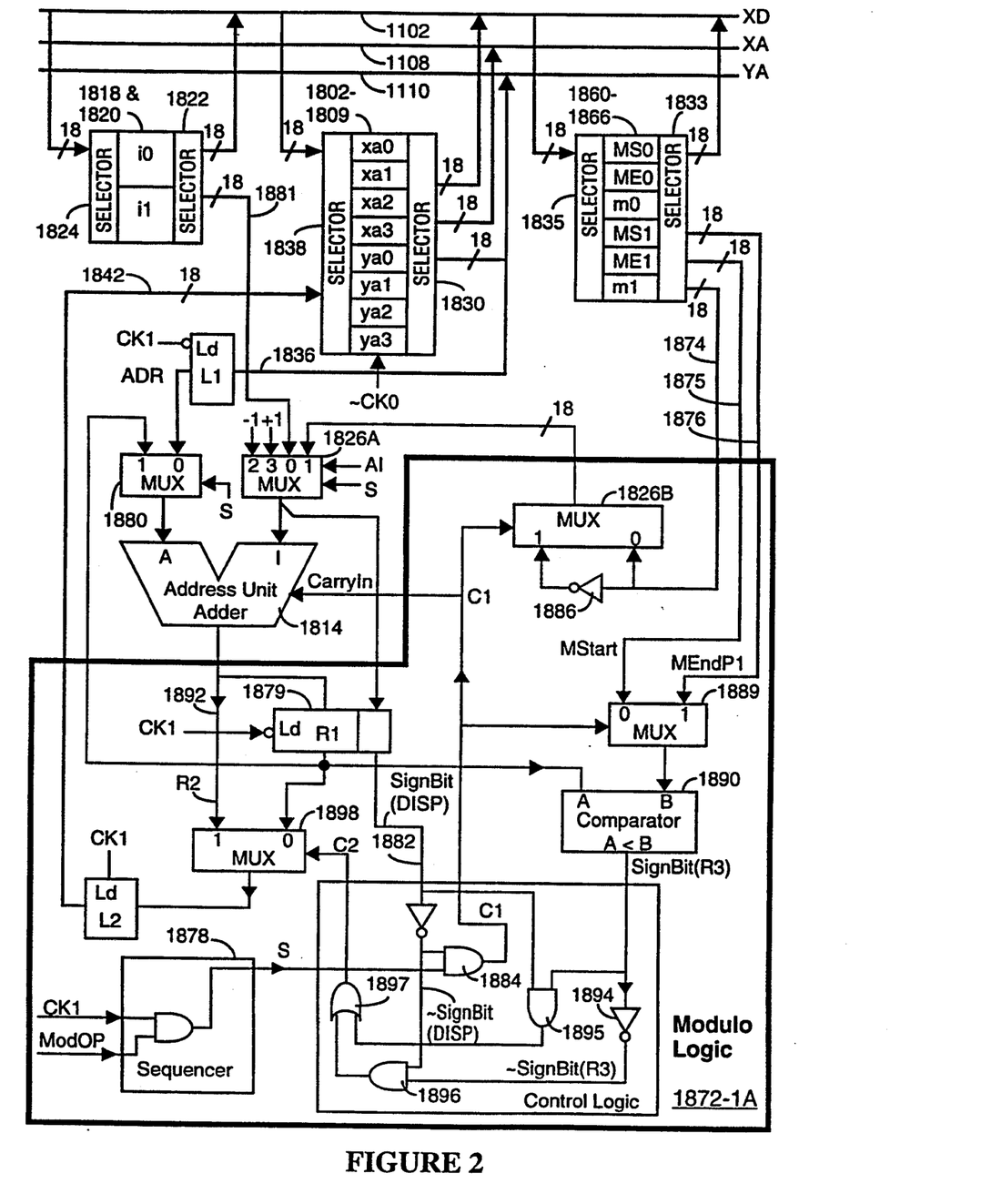
FIG. 2 is a schematic representation of a first preferred embodiment of a modulo addition circuit in accordance with the present invention.
Figure 4:
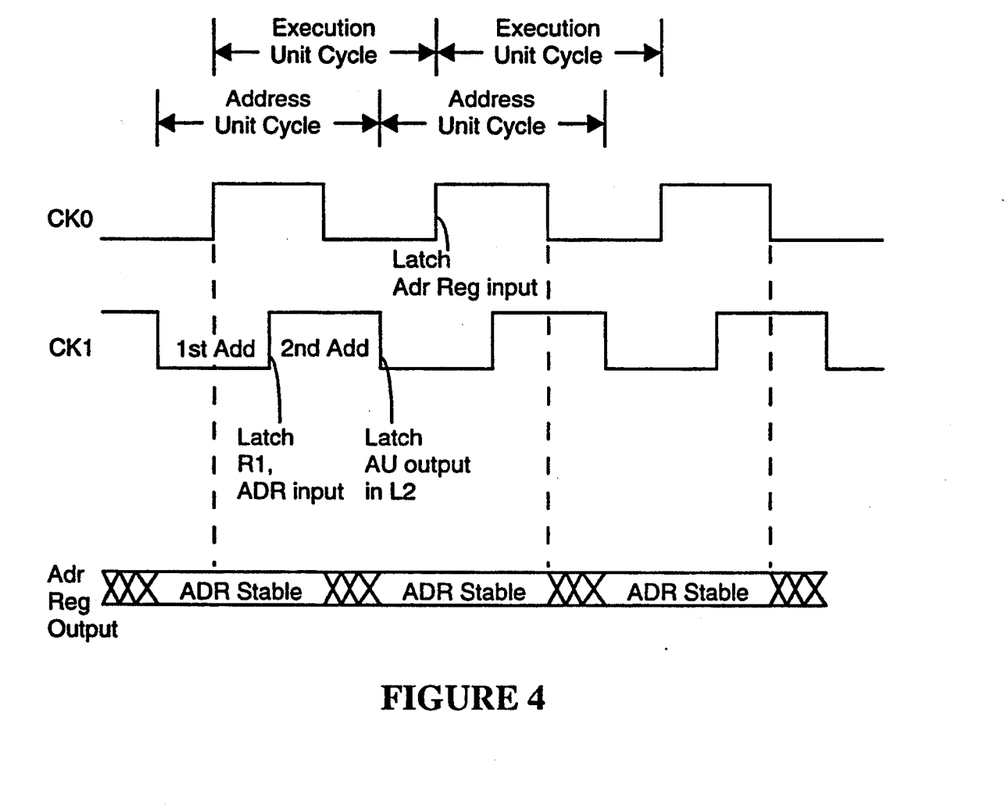
FIG. 4 is a timing diagram for all the preferred embodiments.

Referring to FIGS. 2 and 4, the operation of all the preferred embodiments of the modulo logic circuit 1872 will be described below in terms of the sequence of operations performed. The address unit computation cycle begins one-quarter cycle prior to the computation cycle of the DSP's execution unit. Typically, an address value is computed in one address computation cycle and is asserted on address bus 1836 during the following address computation cycle. For many DSP computations, the address pointers in the address registers are "post incremented" or "post decremented", meaning that the address pointer is automatically incremented or decremented after each computation in which the address pointer is used. In this way the address pointer is updated and ready for the next computation without using a separate computation cycle to update the address pointers being used.

The address value on bus 1836 is used both as the Y address on bus YA and as the input to the YAU adder 1814. The content (labelled ADR in the Figures) of the selected address register passes through a transparent latch L1 during the first half of the address computation cycle (while CK1 is low). The latch L1 holds the input address ADR to the address adder 1814 constant during the second half of the address computation cycle (while CK1 is high).

The new address value computed by the address unit adder 1814 in conjunction with modulo logic 1872 is passed by transparent latch L2 during the second half of the address computation cycle (while CK1 is high) and the computed address value is held constant on bus 1842 during the first half of the next address computation cycle. Furthermore, the address value on bus 1842 is stored in the specified address register (whose contents are being updated) during the second half of the execution computation cycle (while CK0 is low). As a result, the address value output by the selected address register is in transition while both CK0 and CK1 are low (during the last quarter of the address computation cycle), and thus the updated address value is valid one quarter cycle before the beginning of the next execution unit computation cycle.

Sequencer 1878 receives as input signals clock signal CK1 and mode signal ModOP. As mentioned above, CK1 is a clock signal that is low during the first half of each address computation cycle and is high during the second half of each address computation cycle. In the preferred embodiment, the clock signal cycles at 25 Megahertz, and thus each computation cycle is 40 nanoseconds. However, as will be understood by those skilled in the art, the present invention can be used in circuits with other computational speeds. ModOP is a binary signal generated by the local AU controller 1850 that is enabled (i.e., equal to "1") when a modulo computation is being executed and is disabled (i.e., equal to "0") otherwise. The sequencer 1878 generates a sequence signal S that is used to generate another control signal C1. Both the clock signal CK1 and the sequence signal S are low during the first half of each address computation cycle. Signal S is high during the second half of each address computation cycle if ModOP is enabled (i.e., if a modulo computation is being performed), and is low for the entire address computation cycle if ModOP is disabled (i.e., if a modulo computation is not being performed).

First Preferred Embodiment

Modulo Logic With Unrestricted Address Range

Figure 3:
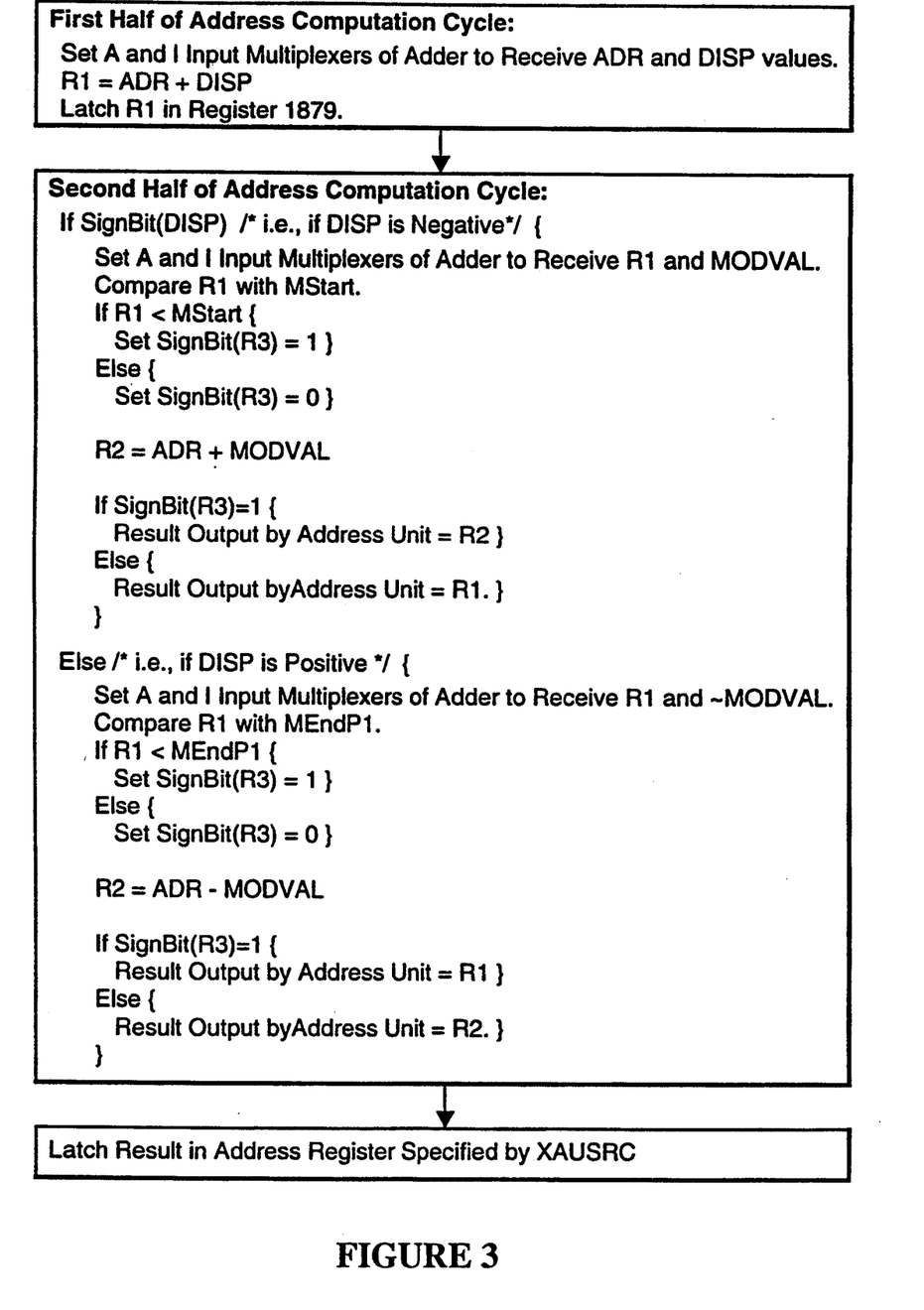
FIG. 3 is a flow chart corresponding to sequence of operations performed by the circuit shown in FIG. 2.

Referring to FIGS. 2, 3 and 4, in the first preferred embodiment, the two modulo value registers 1860 and 1864 are supplemented by associated modulo start and modulo end value registers MS0 1861, ME0 1862, MS1 1865 and ME1 1866. These registers are accessed by the modulo logic circuit 1872-1A as three associated values: when modulo register m0 1860 is accessed and its contents are transmitted on internal bus 1874 to the modulo logic circuit, the associated MS0 and ME0 registers 1861 and 1862 are accessed and their contents transmitted on internal busses 1875 and 1876 to the modulo logic circuit 1872. Similarly, when modulo register m1 1864 is accessed and its contents are transmitted on internal bus 1874 to the modulo logic circuit, the associated MS1 and ME1 registers 1865 and 1866 are accessed and their contents transmitted on internal busses 1875 and 1876 to the modulo logic circuit 1872-1A.

The sequence signal S (which is the same as clock signal CK1 when a modulo address computation is being performed) controls the input signals selected by input multiplexers 1826 and 1880. Multiplexer 1826 has two portions: 1826A and 1826B, as will be described below. It should be noted that multiplexers 1826 and 1880 have multiple inputs, including inputs not used for modulo computations and which are therefore not shown in the Figures. For the purposes of this document it is assumed that when sequence signal S is equal to 0, these multiplexers pass an input based on a control signal (such as selection signal AI for multiplexer 1826A) form the AU local controller 1850, and that when S is equal to "1", the input on port 1 is passed by the multiplexer. Thus, for the purposes of this document, multiplexer 1880 passes its "0" input port data and multiplexer 1826A passes its "0", "2" or "3" input port data during the first half of each address computation cycle and both multiplexers pass the "1" input port data during the second half of the modulo address computation cycle. For non-modulo computations, the input multiplexers do not use the "1" input port data.

As a result, during the first half of a modulo address computation cycle the A input to the address unit adder 1814 is the ADR value on internal bus 1836 and the I input to the address unit adder is either the index value on internal bus 1881 or the value +1 or −1 (for the X address unit another possible I input is the immediate data value). The value passed by the 1 input multiplexer 1826A during the first half of the modulo address computation cycle is herein called the displacement value DISP.

The sign bit of the displacement value, SignBit(-DISP) is carried on line 1882 and is equal to "1" for negative displacement values and is equal to "0" for positive displacement values. The displacement sign bit is stored in a transparent latch herein called the R1 register 1879 (whose input port is enabled when clock signal CK1 is low) so that its value remains constant during the first and second halves of the address computation cycle.

Control signal C1 is generated by AND gate 1884 such that

C1=S-AND-~SignBit(DISP)

where "~SignBit(DISP)" is the inverse of "SignBit(-DISP)". Thus, C1 is always low in the first half of the address computation cycle, and is high during the second half of the address computation cycle if a modulo computation is being performed and the displacement value DISP is positive.

Also during the first half of the address computation cycle, the selected modulo value on internal bus 1874 passes through an inverter 1886 so that the modulo value and its 1's complement are ready at the input ports to multiplexer 1826B.

First Embodiment: First Half of Address Computation Cycle

In the first half of the address computation cycle, the adder 1814 adds a starting address value ADR with a displacement value (DISP), and the result of that addition is stored in R1 register 1879:

$$R1 = ADR + DISP$$

where ADR is a selected address register value from a one of the eight address registers 1802–1809 specified by the XAUSRC signal, and DISP is +1, −1, or one of the two displacement values stored in index registers 1818 and 1820.

First Embodiment: Second Half of Address Computation Cycle

The purpose of the second half of the modulo address computation cycle is to (A) compute a second address value R2 that is offset from the first computed address by an amount equal to the modulo value, and (B) determine which of the two computed address values R1 and R2 is inside the specified address range, and (C) output the determined one of two computed address values.

The R1 value generated in the first half cycle is latched in latch L1 and is input during the second half cycle to the A input port of the adder 1814 by multiplexer 1880. The input to the I input port of the adder 1814 during the second half cycle is controlled by multiplexers 1826A and 1826B. The I port input value to the adder is the modulo value MODVAL on bus 1874 if the displacement value DISP is negative, and is the 1's complement of the modulo value MODVAL if the displacement value DISP is positive. In addition, if the displacement value DISP is positive, a CarryIn value of "1" is sent to the adder 1814. As a result, if DISP is positive, the modulo value is subtracted from R1 to generate the R2 value on internal bus 1892, because the adder performs the following computation:

$$\begin{aligned} R2 &= R1 + \sim MODVAL + 1 \text{ (when DISP is positive)}. \\ &= R1 - MODVAL. \end{aligned}$$

When DISP is negative, R2 is equal to R1 plus MODVAL.

The modulo computation generates a sequence of address values in an address range bounded at the lower end by a value herein called MStart and at the upper end by a value herein called MEnd. The value MEndP1 used in the first preferred embodiment is equal to MEnd plus 1. The MStart and MEndP1 values are stored in modulo registers 1861 and 1862 or 1865 and 1866 prior to performing the modulo address computation and are transmitted by internal busses 1875 and 1876 to a multiplexer 1889. The output selection signal for the multiplexer 1889 is C1. As explained above, C1 equals 1 during the second half of the address computation cycle if a modulo computation is being performed and the displacement value DISP is positive and otherwise C1 equals 0. Thus, when the displacement value DISP is positive, the multiplexer 1889 outputs the MEndP1 value during the second half of the address computation, and when the displacement value DISP is negative the multiplexer 1889 outputs the MStart value during the second half of the address computation.

In the second half of the modulo address computation cycle, the comparator 1890 compares the R1 value in the R1 register 1879 with the MStart value if the displacement value DISP is negative and compares the R1 value in the R1 register 1879 with the MEndP1 value if the displacement value DISP is positive.

The output of the comparator 1890 is called Sign-Bit(R3) because it is equal to the sign bit of the value R3, where R3 is defined as:

$R3 = R1 - \text{MStart}$, if DISP is negative;

$R3 = R1 - \text{MEndP1}$, if DISP is positive.

In an alternate embodiment, the comparator 1890 can be replaced with a subtractor circuit that performs the subtraction computations shown above to computer R3, with the sign bit of the result R3 being used as Sign-Bit(R3).

The modulo logic circuit 1872 generates a control signal C2 (using gates 1894–1897) that is defined as follows:

$$C2 = \{\text{SignBit(DISP) .AND. SignBit(R3)}\} \text{ OR}$$
$$\{\sim\text{SignBit(DISP) .AND. } \sim\text{SignBit(R3)}\}$$

Conceptually, C2 is equal to "1" if the value R1 is outside the address range bounded by MStart and MEnd, and is equal to "0" otherwise. As explained above, the SignBit(DISP) value is stored in latch 1879 so that its value is stable throughout the address computation even though the value passed by the I input mutliplexer 1826A changes at the middle of the address computation.

Finally, the address value output onto bus 1842 by the modulo logic circuit 1872-1 via output selection multiplexer 1898 is equal to R2 if C2 is equal to "1" and is equal to the value R1 otherwise. Latch L2 is open during the second half of the address computation and holds the selected address output value on bus 1842 during the first half of the next address computation cycle. The value output on bus 1842 is stored in the same address register 1802–1809 from which the starting address value ADR was retrieved.

When the adder unit 1814 is used to perform address computations other than modulo computations, ModOP is disabled and the sequencer 1878 is inactive. As a result, the input selector multiplexers 1826A and 1880 input the same two values ADR and DISP for the entire computation cycle. Therefore the R1 and R2 values generated by the modulo logic are the same and the R1 value is output onto bus 1842.

The address range used in the first preferred embodiment is unrestricted because the first address value computed, R1, is directly compared with the upper or lower bound of the address range (depending on whether the displacement used is positive or negative). While this requires the use of at least two extra registers to store the upper and lower address range boundaries, it has the advantage of enabling a programmer or compiler to place an array of data anywhere in the DSP's available memory, which can make the use of memory more efficient and/or convenient.

First Preferred Embodiment: Cascaded Adder Implementation

Figure 5:
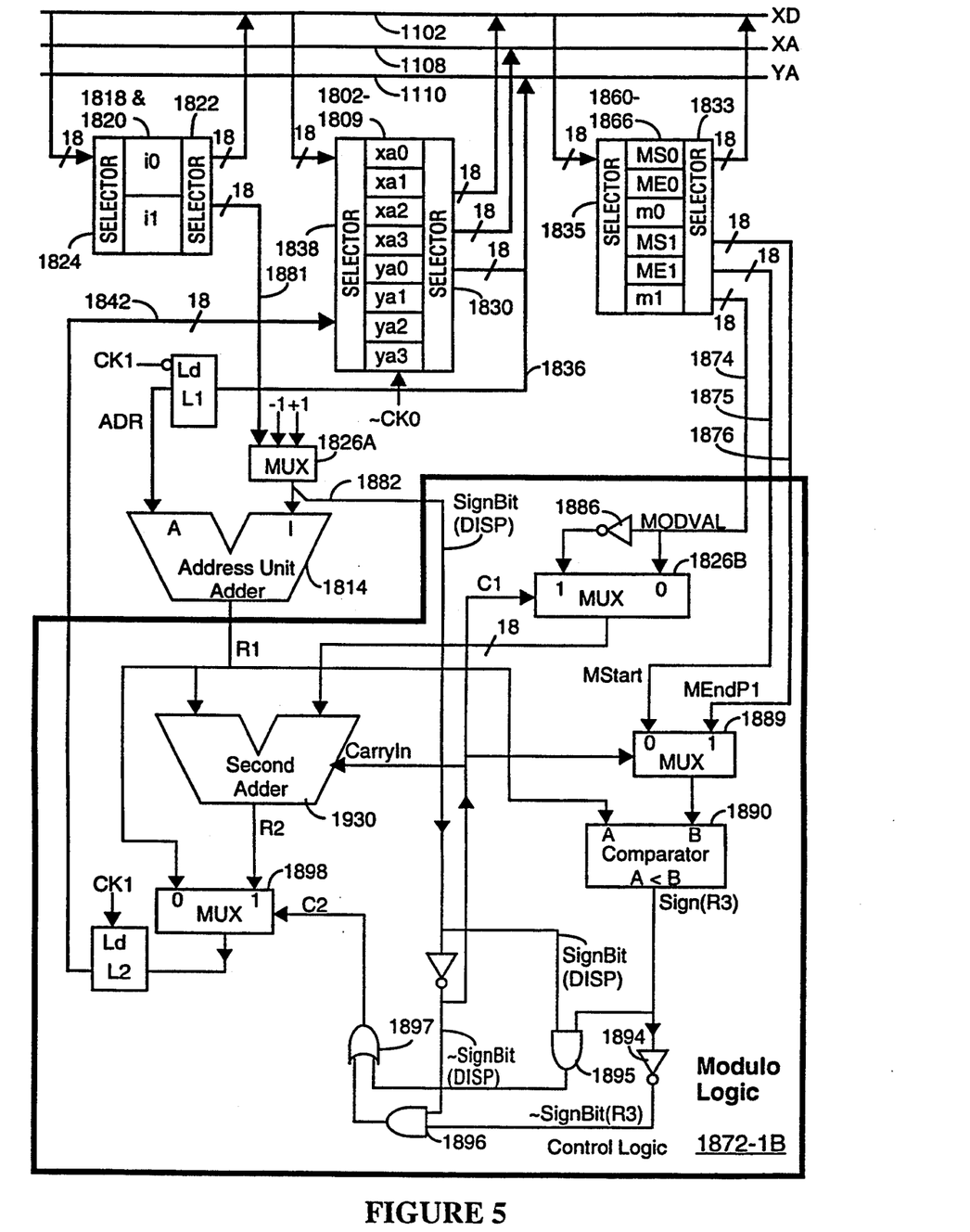
FIG. 5 is a schematic representation of a second implementation of the first preferred embodiment, using two cascaded adder circuits.

In the implementation of the first preferred embodiment shown in FIG. 2 the adder 1814 is used to perform two additions in each computation cycle. A faster circuit, herein referred to as modulo logic circuit 1872-1B, for performing the same functions is shown in FIG. 5. This second implementation of the modulo logic circuit is for use in situations in which the circuit 1872-1A of FIG. 2 is not sufficiently fast; for instance, for implementations with shorter computation cycle times.

The modulo logic circuit 1872-1B uses a second adder 1930 that is cascaded with the primary address unit adder 1814. By using a second cascaded adder 1930, the following circuits from the first implementation can be eliminated: the sequencer 1878, the R1 register 1879, AND gate 1884 and input multiplexers 1826 and 1880. The elimination of these circuit components reduces the net amount of circuitry added to the modulo logic circuit 1872 associated with using a second adder.

The elimination of the latching register 1879 and sequencer 1878 allows the two cascaded adders to generate R1 and R2 values without any clocking limitations, and thus reduces the amount of time required to produce a valid output value.

The operation of modulo logic circuit 1872-1B is similar to that of the circuit shown in FIG. 2. In particular, R1 is computed by the first address adder 1814:

$R1 = \text{ADR} + \text{DISP}$.

Multiplexer 1826B in conjunction with inverter 1886 sends to the second input of the second adder 1930 MODVAL if the displacement value DISP is negative, or $\sim$MODVAL if the displacement value DISP is positive. The second adder 1930 performs the following computation:

$R2 = R1 + \text{MODVAL}$ (when DISP is negative)

$R2 = R1 + \sim\text{MODVAL} + 1$ (when DISP is positive)
$= R1 - \text{MODVAL}$ The value of SignBit(R3) and C2 are computed in exactly the same way in the implementation shown in FIG. 5 as in the implementation shown in FIG. 2. Thus, the value output by the modulo logic circuit to the internal bus 1842 is selected from R1 and R2 in the same way as described above with respect to FIG. 2.

Second Preferred Embodiment

Modulo Logic With Restricted Address Range

Figure 6:
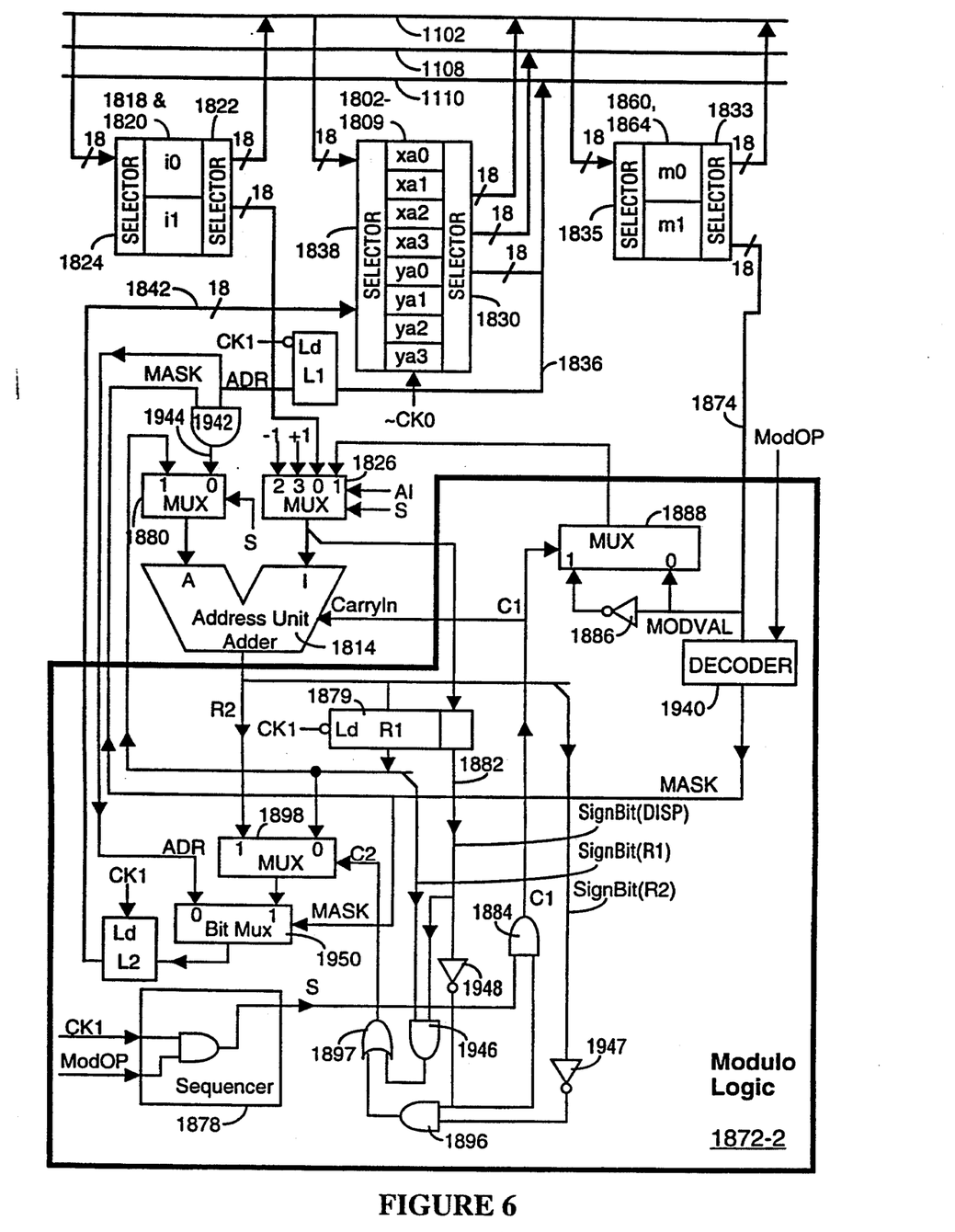
FIG. 6 is a schematic representation of a second preferred embodiment of a modulo addition circuit in accordance with the present invention.

Referring to FIG. 6, the lower bound of the address range accessed by the modulo addressing computation is restricted as follows: if the most significant bit of the modulo value MODVAL that is set to "1" is bit N, then the lower bound address must have bits 0 through N set to "0".

$N = \text{Log2 (MODVAL)}$ where "Log2 (MODVAL)" means the integer portion of Log2 (MODVAL).

MASK=$2^{N+1}-1$ (i.e., MASK=000...1111, with N+1 "1" bits)

Lower Bound=ADR·AND·~MASK

As shown in FIG. 6, a decoder 1940 generates the MASK value from the modulo value MODVAL in selected modulo register 1860 or 1864. The MASK value generated by the decoder is an 18-bit value with the 17-N most significant bits set to "0", followed by N+1 bits set to "1". When a modulo address computation is not being performed, ModOP is disabled and the MASK value generated by the decoder 1940 is equal to all "1" bits.

An AND gate 1942 logically ANDs the input address ADR with the MASK, thereby putting onto line 1944 a value that is equal to just the N+1 least significant bits of the input address ADR.

The upper bound of the address range to be accessed is specified by the modulo value MODVAL and is equal to the lower bound, plus MODVAL, minus 1:

Upper Bound=Lower Bound+MODVAL−1.

Since the lower bound and upper bound addresses are defined by the MODVAL, the MStart and MEndP1 registers 1861, 1862, 1865 and 1866 (see FIG. 2) are not needed in this embodiment.

It should be noted that the magnitude of the displacement value DISP must be less than or equal to the modulo value:

−MODVAL≤DISP≤MODVAL.

As in the first embodiment shown in FIG. 2, the modulo logic circuit 1872-2 of the second embodiment (shown in FIG. 6) utilizes a sequencer 1878 that generates the same sequence signal S as in the first embodiment.

During the first half of the computation cycle, (A) the decoder 1940 generates the MASK value, input multiplexers 1826 and 1880 pass to the address unit adder 1814 the masked ADR value (i.e., the N+1 least significant bits of ADR) and the displacement value DISP, (B) the adder 1814 computes R1:

R1=(ADR·AND·MASK)+DISP, and (C) the R1 value is latched into the R1 register 1879.

During the second half of each computation cycle in which ModOP is enabled, the sequence signal S is equal to 1, causing the adder's input multiplexers 1826 and 1880 to select the R1 and MODVAL inputs. As in the first embodiment shown in FIG. 2, the C1 control signal equals "1" if the displacement value DISP is positive and equals "0" otherwise.

The input to the I input port of the adder 1814 during the second half cycle is controlled by multiplexers 1826A and 1826B. The I port input value to the adder is the modulo value MODVAL on bus 1874 if the displacement value DISP is negative, and is the 1's complement of the modulo value MODVAL if the displacement value DISP is positive. In addition, if the displacement value DISP is positive, a CarryIn value of "1" is sent to the adder 1814. As a result, if DISP is positive, the modulo value is subtracted from R1 to generate the R2 value on internal bus 1892, because the adder performs the following computation:

R2 = R1 + ~MODVAL + 1 (when DISP is positive).
 = R1 − MODVAL.

When DISP is negative, R2 is equal to R1 plus MODVAL.

Next, the modulo logic circuit 1872-2 generates a control signal C2 (using gates 1896, 1897, 1946–1948) that is defined as follows:

C2 = {SignBit(DISP) .AND. SignBit(R1)} OR
  {~SignBit(DISP) .AND. ~SignBit(R2)}

Conceptually, C2 is equal to "1" if the value R1 is outside the address range bounded by the lower and upper bounds as described above, and is equal to "0" when R1 is inside the specified address range. Multiplexer 1898 outputs the R1 value when C2 is equal to 0 and outputs the R2 value when C2 is equal to 1.

Finally, the address value output onto bus 1842 by the modulo logic circuit 1872-2 is generated by a Bit Multiplexer 1950, which is essentially eighteen 2-to-1 multiplexers, each controlled by a separate bit of the MASK signal. For each bit of the MASK signal that is equal to "0", the corresponding bit of the ADR value is passed by the Bit Multiplexer 1950 to output bus 1842, and for each bit of the MASK signal that is equal to "1", the corresponding bit of the R1 or R2 value selected by multiplexer 1898 is passed by the Bit Multiplexer 1950 to output bus 1842. Thus the Bit Multiplexer 1950 outputs an 18-bit value whose 17-N most significant bits are the 17-N most significant bits of ADR and whose N+1 least significant bits are the N+1 least significant bits of the value output by multiplexer 1898.

The operation of the output selection multiplexer 1898 and Bit Multiplexer 1950 can be represented as follows:

If C2 = 1{
  Result = (R2 .AND. MASK) .OR. (ADR .AND. ~MASK)}
Else{
  Result = (R1 .AND. MASK) .OR. (ADR .AND. ~MASK)}

The value output on bus 1842 is stored in the same address register 1802–1809 from which the starting address value ADR was retrieved.

Third Preferred Embodiment

Modulo Logic With Restricted Address Range

Figure 7:
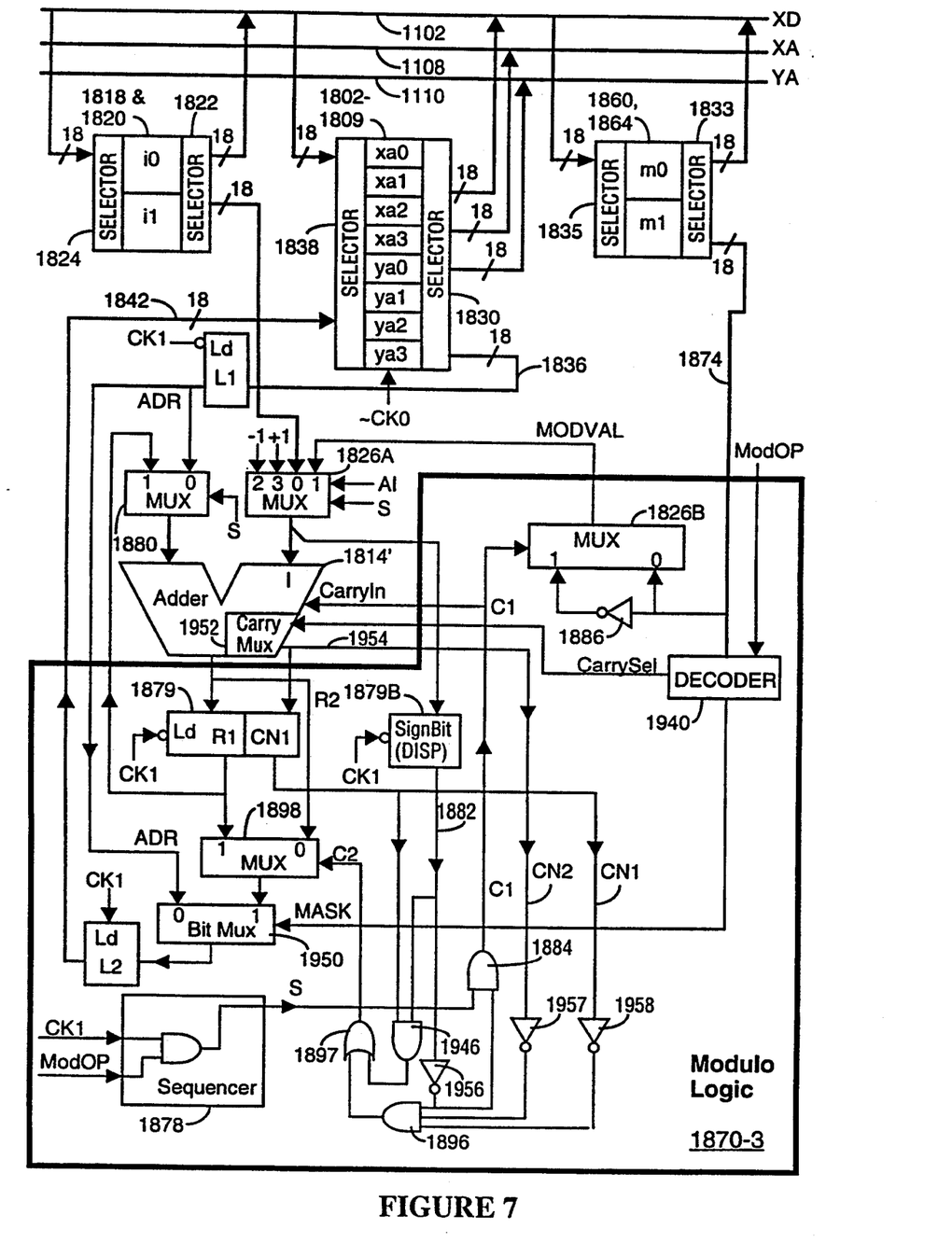
FIG. 7 is a schematic representation of a third preferred embodiment of a modulo addition circuit in accordance with the present invention.

Referring to FIG. 7, the third preferred embodiment is similar to the second preferred embodiment in that the lower bound of the address range accessed by the modulo addressing computation must have bits 0 through N set to "0" if the most significant bit of the modulo value MODVAL that is set to "1" is bit N. As in the second embodiment, the third embodiment uses a decoder 1940 to generate a MASK value defined as:

MASK=$2^{N+1}-1$ (i.e., MASK=000...1111, with N+1 "1" bits)

When a modulo address computation is being performed, as indicated by ModOp being enabled, the MASK value generated by the decoder 1940 is an 18-bit value with the 17-N most significant bits set to "0", followed by N+1 bits set to "1". When ModOp is disabled, the MASK value generated by the decoder 1940 is equal to all "1" bits.

The embodiment of FIG. 7 differs from that of FIG. 5 in that (A) the input address value ADR is not masked, (B) the internal carry signals from the address unit adder 1814' are used in this embodiment instead of the R1 and R2 sign bits, (C) the decoder 1940, register 1879 and C2 logic generation circuits are modified to accommodate the use of carry bits instead of the R1 and R2 sign bits, and (D) the logical interpretation of C2 is reversed from that of the first two embodiments.

In particular, the adder 1814' is modified by adding a "Carry Multiplexer" 1952 to the adder 1814' for accessing any specified carry bit generated by the adder 1814'. The adder 1814' generates eighteen carry bits, where each carry bit represents the carry from one bit to the next most significant bit of the value generated by the adder. The Carry Multiplexer 1952 outputs one of those eighteen carry bits onto line 1954 as specified by the multiplexer selection signal CarrySel.

The decoder 1940 generates, in addition to the MASK signal, the CarrySel signal. The CarrySel signal selects the carry bit from bit N to bit N+1 in the adder (i.e., the carry bit corresponding to the Nth bit of the adder), where bit N is the most significant bit of the modulo value MODVAL that is set to "1".

When the adder 1814' is adding two positive numbers, the N to N+1 carry bit is equal to "1" only if the adder "overflows" bit N. When adding two positive values to generate R1, the carry bit CN1 is equal to 1 only if the addition of the N least significant bits of the two input values exceeds FF..F (i.e., N 1's) in value, thereby indicating that the generated value R1 is outside the specified address range. When the adder 1814' is adding a negative number to a positive number (e.g., when a negative displacement value is used in the first addition for generating R1), the N to N+1 carry bit is equal to "0" if the N least significant bits of the resulting value represents a negative value and is equal to "1" if the N least significant bits of the resulting value is positive. Thus, for a negative displacement, carry bit CN1 equals 0 if the R1 value is outside the specified address range.

The selected carry bit CN1 from the adder computation in the first half of the computation cycle is stored in a one-bit extension of the R1 register 1879 (and the sign bit of the displacement is stored in another one-bit extension of the R1 register labelled 1879B). The selected carry bit from the adder computation in the second half of the computation cycle is labelled CN2.

The modulo logic circuit 1872-3 generates control signal C2 (using gates 1896, 1897, 1946, 1956-1958), which is defined as follows:

```
C2 = {SignBit(DISP) .AND. CN1} OR
     {~SignBit(DISP) .AND. ~CN1 .AND. ~CN2}
```

C2 is equal to "1" if the value R1 is inside the address range bounded by the lower and upper bounds as described above, and is equal to "0" otherwise. Multiplexer 1898 outputs the R1 value when C2 is equal to 1 and outputs the R2 value when C2 is equal to 0.

The Bit Multiplexer 1950 outputs an 18-bit value whose 17-N most significant bits are the 17-N most significant bits of ADR and whose N+1 least significant bits are the N+1 least significant bits of the value output by multiplexer 1898.

The operation of the output selection multiplexer 1898 and Bit Multiplexer 1950 can be represented as follows:

```
If C2 = 1{
    Result = (R1 .AND. MASK) .OR. (ADR .AND. ~MASK)}
Else{
    Result = (R2 .AND. MASK) .OR. (ADR .AND. ~MASK)}
```

The value output on bus 1842 is stored in the same address register 1802-1809 from which the starting address value ADR was retrieved.

Alternate Embodiments

The preferred embodiments shown in FIGS. 2, 6 and 7 use a single adder circuit for each modulo address unit. These embodiment work well for computational cycles of 40 nanoseconds, and are expected to work well for computational cycles of as short as 25 nanoseconds. However, for implementations with very short computational cycles times the present invention can be implemented with two cascaded adder circuits.

As can be seen by comparing FIGS. 2 and 5, when a second cascaded adder is inserted into any of the three preferred embodiments to achieve faster operation, less multiplexing circuitry is needed and the R1 register 1879 is no longer needed. As a result, the added circuitry required for the second adder is somewhat offset by reductions in the circuitry other used for multiplexers and the R1 latch.

In addition, as will be understood by those skilled in the art, the bit sizes of the data values being added, and the particular logic circuitry used to control the modulo computation process may be modified for use in other contexts without departing from the spirit and teachings of the present invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A modulo adder circuit coupled to control circuitry that provides a sequencing signal indicating first and second portions of a predefined computation cycle, said modulo adder circuit comprising:

an adder circuit;

registers for storing data including a starting value, a displacement value and a modulo value;

input selection circuitry coupled to said registers, said adder circuit and said sequencing signal for directing data stored in said registers to said adder circuit, said input selection circuitry directing said starting value and said displacement value to said adder circuit during said first portion of said predefined computation cycle; said adder circuit computing a first result R1 during said first portion of said predefined computation cycle;

said registers including a register coupled to said adder circuit for storing said first result R1;

said input selection circuitry including circuitry responsive to said sequencing signal for directing said first result R1 and data Corresponding to said modulo value to said adder circuit during said second portion of said predefined computation cycle; said adder circuit computing a second result R2 during said second portion of said predefined computation cycle; and output circuitry, coupled to receive said first results, for selecting one of said first and second results and outputting a result corresponding selected result such that the result output by said output circuitry falls inside a predefined value range.

2. The modulo adder circuit of claim 1, wherein said stored displacement value includes a sign bit indicating whether said displacement value is positive or negative; said modulo adder circuit further including:

an inverter coupled to said registers for receiving and inverting said modulo value to generate a 1's complement modulo value;

a modulo selection multiplexer coupled to said registers and said inverter for selecting one of said modulo value and said 1's complement modulo value in accordance with said sign bit of said displacement value and for outputting the selected value;

said modulo selection multiplexer having an output port coupled to said input selection circuitry such that said input selection circuit directs the selected value output by said modulo selection multiplexer to said adder circuit; and carry in circuitry for generating a carry in value supplied to said adder circuit when said modulo selection multiplexer selects said 1's complement modulo value such that said adder circuit computes said value R2 to be equal to R1 minus said modulo value when said sign bit of said displacement value indicates that said displacement value is positive.

3. The modulo adder circuit of claim i, wherein

N is an integer corresponding to the most significant bit position in said stored modulo value that is set equal to "1";

said output result has an associated bit length, M;

said modulo adder circuit includes a decoder that decodes said stored modulo value to generate a mask value whose N+1 least significant bits are set to a first binary value and whose M−N−1 most significant bits are set equal to a second binary value that is the inverse of said first binary value; and said output circuitry including a bit multiplexer that receives said selected result and said starting value at input ports of said bit multiplexer and said mask value output at a selection port of said bit multiplexer and outputs a value whose N+1 least significant bits are the N+1 least significant bits of said selected result and whose M−N−1 most significant bits are the M−N−1 most significant bits of said starting value.

4. The modulo adder circuit of claim 3, wherein said stored displacement value includes a sign bit indicating whether said displacement value is positive or negative;

said adder circuit generates M carry bits and said adder circuit includes a carry bit multiplexer for outputting any one of said M carry bits specified by a carry bit selection signal; said carry bit multiplexer outputting a first carry bit CN1 during said first portion of said predefined computation cycle and outputting a second carry bit CN2 during said second portion of said predefined computation cycle;

said modulo adder circuit's decoder decodes said stored modulo value to generate said carry bit selection signal so as to select the one of said M carry bits corresponding to the Nth bit of said first and second results generated by said adder circuit;

said modulo adder circuit includes a latch for storing the first carry bit CN1 output by said carry bit multiplexer during said first portion of said predefined computation cycle; and said output circuitry including logic circuitry for selecting and outputting to said bit multiplexer one of said first and second results in accordance with a predefined boolean function of said displacement value's sign bit, and said first and second carry bits CN1 and CN2.

5. The modulo adder circuit of claim 1, wherein said stored displacement value includes a sign bit indicating whether said displacement value is positive or negative;

N is an integer corresponding to the most significant bit position in said stored modulo value that is set equal to "1";

said output result has an associated bit length, M;

said adder circuit generates M carry bits and said adder circuit includes a carry bit multiplexer for outputting any one of said M carry bits specified by a carry bit selection signal; said carry bit multiplexer outputting a first carry bit CN1 during said first portion of said predefined confutation cycle and outputting a second carry bit CN2 during said second portion of said predefined computation cycle;

said modulo adder circuit includes a decoder that decodes said stored modulo value to generate said carry bit selection signal so as to select the one of said M carry bits corresponding to the Nth bit of said first and Second results generated by said adder circuit;

said modulo adder circuit includes a latch for storing the first carry bit CN1 output by said carry bit multiplexer during said first portion of said predefined computation cycle; and said output circuitry including logic circuitry for selecting and outputting one of said first and second results in accordance with a predefined boolean function of said displacement value's sign bit, and said first and second carry bits CN1 and CN2.

6. The modulo adder circuit of claim 1, wherein said stored displacement value includes a sign bit indicating whether said displacement value is positive or negative;

said registers further store lower and upper boundary values;

said output circuitry includes a comparator for comparing said first result value R1 with said lower boundary value when said displacement value's sign bit indicates that said displacement value is negative, for comparing said first result value R1 with said upper boundary value when said displacement value's sign bit indicates that said displacement value is positive, and for generating a comparison result signal;

said output circuitry including logic circuitry for outputting one of said first and second results in accordance with a predefined boolean function of said displacement value's sign bit and said comparison result signal.

7. A modulo adder circuit coupled to control circuitry that provides a sequencing signal indicating first and second portions of a predefined computation cycle, said modulo adder circuit comprising:

registers for storing data including a starting value, a displacement value and a modulo value; said displacement value having a sign bit indicating whether said displacement value is positive or negative;

a first adder circuit having two input ports and an output port, said two input ports coupled to said registers to receive said starting value and said displacement value, said first adder circuit generating a first result value R1 at said output port;

a second adder circuit having a first input port coupled to said first adder's output port, a second input port and an output port; said second adder circuit generating a second result value R2;

an inverter for inverting said modulo value to generate a 1's complement modulo value; and a modulo selection multiplexer for selecting one of said modulo value and said 1's complement modulo value in accordance with said sign bit of said displacement value and for outputting the selected value to said second adder circuit's second input port;

carry in circuitry for generating a carry in value supplied to said second adder circuit when said modulo selection multiplexer selects said 1's complement modulo value such that said adder circuit computes said value R2 to be equal to R1 minus said modulo value when said sign bit of said displacement value indicates that said displacement value is positive and otherwise computes said value R2 to be equal to R1 plus said modulo value;

output circuitry, coupled to receive said first and second results, for selecting one of said first and second results and outputting a result corresponding to said selected result such that the result output by said output circuitry falls inside a predefined value range.

8. The modulo adder circuit of claim 7, wherein
said registers further stores lower and upper boundary values;

said output circuitry includes a comparator for comparing said first result value R1 with said lower boundary value when said displacement value's sign bit indicates that said displacement value is negative, for comparing said first result value R1 with said upper boundary value when said displacement value's sign bit indicates that said displacement value is positive, and for generating a comparison result signal;

said output circuitry including logic circuitry for outputting one of said first and second results in accordance with a predefined boolean function of said displacement value's sign bit and said comparison result signal.

9. A method of operating a modulo adder circuit, comprising:

storing a starting value, a displacement value and a modulo value to said adder circuit;

receiving a sequencing signal for indicating first and second portions of a predefined computation cycle;

directing said starting value and said displacement value to said adder circuit during said first portion of said predefined computation cycle to compute a first result R1 during said first portion of said predefined computation cycle;

storing said first result R1 in a register at the end of said first portion of said predefined computation period;

directing said first result R1 and data corresponding to said modulo value to said adder circuit during said second portion of said predefined computation cycle to compute a second result R2 during said second portion of said predefined computation cycle; and selecting one of said first and second results prior to completion of said second portion of said predefined computation cycle and outputting a result corresponding to said Selected result such that the output result falls inside a predefined value range.

10. The method of claim 9, wherein said displacement value includes a sign bit indicating whether said displacement value is positive or negative; said method further including:

inverting said modulo value to generate a 1's complement modulo value;

selecting one of said modulo value and said 1's complement modulo value in accordance with said sign bit of said displacement value and outputting the selected value to said adder circuit during said second portion of said predefined computation cycle; and generating a carry in value supplied to said adder circuit when said modulo selection step selects said 1's complement modulo value such that said adder circuit computes said value R2 to be equal to R1 minus said modulo value when said sign bit of said displacement value indicates that said displacement value is positive.

11. The method of claim 9, wherein N is an integer corresponding to the most significant bit position in said modulo value that is set equal to "1", and said output result has an associated bit length, M; said method further including:

decoding said modulo value to generate a mask value whose N+1 least significant bits are set to a first binary value and whose M−N−1 most significant bits are set equal to a second binary value that is the inverse of said first binary value;

wherein said outputting step outputs a value whose N+1 least significant bits are the N+1 least significant bits of said selected result and whose M−N−1 most significant bits are the M−N−1 most significant bits of said starting value.

12. The method of claim 11, wherein said displacement value includes a sign bit indicating whether said displacement value is positive or negative; and said adder circuit generates M carry bits; said method including:

outputting from said adder circuit a first carry bit CN1, corresponding to the Nth bit of said M carry bits during said first portion of said predefined computation cycle, and outputting from said adder circuit a second carry bit CN2, corresponding to the Nth bit of said M carry bits during said second portion of said predefined computation cycle;

storing the first carry bit CN1 output by said carry bit multiplexer during said first portion of said predefined computation cycle; and said selecting and outputting steps selecting and outputting one of said first and second results in accordance with a predefined boolean function of said displacement value's sign bit, and said first and second carry bits CN1 and CN2.

13. The method of claim 9, wherein said displacement value includes a sign bit indicating whether said displacement value is positive or negative, N is an integer corresponding to the most significant bit position in said modulo value that is set equal to "1", said output result has an associated bit length, M, and said adder circuit generates M carry bits; said method including:

outputting from said adder circuit a first carry bit CN1, corresponding to the Nth bit of said M carry bits during said first portion of said predefined computation cycle, and outputting from said adder circuit a second carry bit CN2, corresponding to the Nth bit of said M carry bits during said second portion of said predefined computation cycle;

storing the first carry bit CN1 output by said carry bit multiplexer during said first portion of said predefined computation cycle; and said selecting and outputting steps selecting and outputting one of said first and second results in accordance with a predefined boolean function of said displacement value's sign bit, and said first and second carry bits CN1 and CN2.

14. The method of claim 9, wherein said displacement value includes a sign bit indicating whether said displacement value is positive or negative; said method including:

storing lower and upper boundary values;

comparing said first result R1 with said lower boundary value when said displacement value's sign bit indicates that said displacement value is negative, comparing said first result R1 with said upper boundary value when said displacement value's sign bit indicates that said displacement value is positive, and generating a comparison result signal; and outputting one of said first and second results in accordance with a predefined boolean function of said displacement value's sign bit and said comparison result signal.

* * * * *